(12) United States Patent
Gim et al.

(10) Patent No.: US 11,624,940 B2
(45) Date of Patent: Apr. 11, 2023

(54) LIGHT MODULATION ELEMENT

(71) Applicant: LG Chem, Ltd., Seoul (KR)

(72) Inventors: Min Jun Gim, Daejeon (KR); Eun Jung Lim, Daejeon (KR); Jung Sun You, Daejeon (KR); Jin Hong Kim, Daejeon (KR); Hyun Jun Lee, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/434,598

(22) PCT Filed: Mar. 3, 2020

(86) PCT No.: PCT/KR2020/002995
§ 371 (c)(1),
(2) Date: Aug. 27, 2021

(87) PCT Pub. No.: WO2020/180086
PCT Pub. Date: Sep. 10, 2020

(65) Prior Publication Data
US 2022/0137437 A1    May 5, 2022

(30) Foreign Application Priority Data
Mar. 7, 2019  (KR) .......................... 10-2019-0026114

(51) Int. Cl.
| | | |
|---|---|---|
| G02F 1/1339 | (2006.01) | |
| G02F 1/01 | (2006.01) | |
| G02F 1/1347 | (2006.01) | |
| G02F 1/139 | (2006.01) | |

(52) U.S. Cl.
CPC .......... G02F 1/0136 (2013.01); G02F 1/1396 (2013.01); G02F 1/13471 (2013.01); G02F 2202/04 (2013.01)

(58) Field of Classification Search
CPC .. G02F 1/0136; G02F 1/13471; G02F 1/1396; G02F 2202/04; G02F 2202/043; G02F 2202/16; G02F 1/13476; G02F 1/13712; G02F 1/1375; G02F 1/13475
See application file for complete search history.

(56) References Cited

U.S. PATENT DOCUMENTS

| | | | |
|---|---|---|---|
| 5,317,431 A | 5/1994 | Yoshida et al. | |
| 5,342,545 A | 8/1994 | Yamada et al. | |
| 2008/0094551 A1* | 4/2008 | Hayashi | G02F 1/13475 349/106 |
| 2009/0323012 A1 | 12/2009 | He et al. | |
| 2013/0082986 A1 | 4/2013 | Yamauchi | |
| 2013/0342772 A1 | 12/2013 | Lim et al. | |
| 2016/0070132 A1 | 3/2016 | Soto et al. | |
| 2016/0291357 A1 | 10/2016 | Min et al. | |
| 2017/0307939 A1* | 10/2017 | Banin | G02F 1/133723 |
| 2018/0067355 A1 | 3/2018 | Kim et al. | |
| 2018/0373068 A1* | 12/2018 | Lim | G02F 1/13725 |
| 2018/0373084 A1* | 12/2018 | Lim | G02F 1/13725 |
| 2019/0049641 A1 | 2/2019 | Oh et al. | |
| 2019/0112529 A1 | 4/2019 | Kim et al. | |

FOREIGN PATENT DOCUMENTS

| | | |
|---|---|---|
| JP | H03-014883 A | 1/1991 |
| JP | H05-333323 A | 12/1993 |
| JP | 2000194007 A | 7/2000 |
| JP | 2000314867 A | 11/2000 |
| JP | 201376955 A | 4/2013 |
| JP | 2018522260 A | 8/2018 |
| KR | 930010594 A | 6/1993 |
| KR | 20110010815 A | 2/2011 |
| KR | 20150105266 A | 9/2015 |
| KR | 101612228 B1 | 4/2016 |
| KR | 20160115795 A | 10/2016 |
| KR | 20170025345 A | 3/2017 |
| KR | 20170086729 A | 7/2017 |
| KR | 20170117893 A | 10/2017 |
| TW | 201721194 A | 6/2017 |

OTHER PUBLICATIONS

Taiwan Search Report for Application No. 109106953, dated Jul. 26, 2021, 1 page.
Search report from International Application No. PCT/KR2020/002995, dated Jun. 12, 2020.
Extended European Search Report including Written Opinion for Application No. 20766638.9 dated Mar. 29, 2022, pp. 1-7.

* cited by examiner

*Primary Examiner* — Donald L Raleigh
(74) *Attorney, Agent, or Firm* — Lerner, David, Littenberg, Krumholz & Mentlik, LLP

(57) ABSTRACT

A light modulation element that can vary between a bright transparent mode and a dark scattering mode is provided. The light modulation element has a first light modulation layer and a second light modulation layer comprising nematic liquid crystals and a dichroic dye in a scattering mode when a voltage is applied. The first light modulation layer and the second light modulation layer are disposed to overlap each other. The light modulation element has an improved contrast ratio and haze-variable characteristics, without precipitation of dichroic dyes and an increase in power consumption.

14 Claims, 2 Drawing Sheets

[Figure 1]
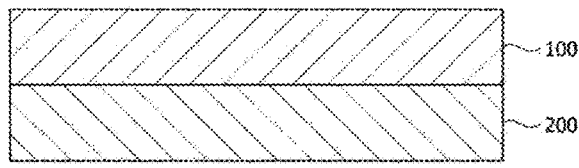
[Figure 2]
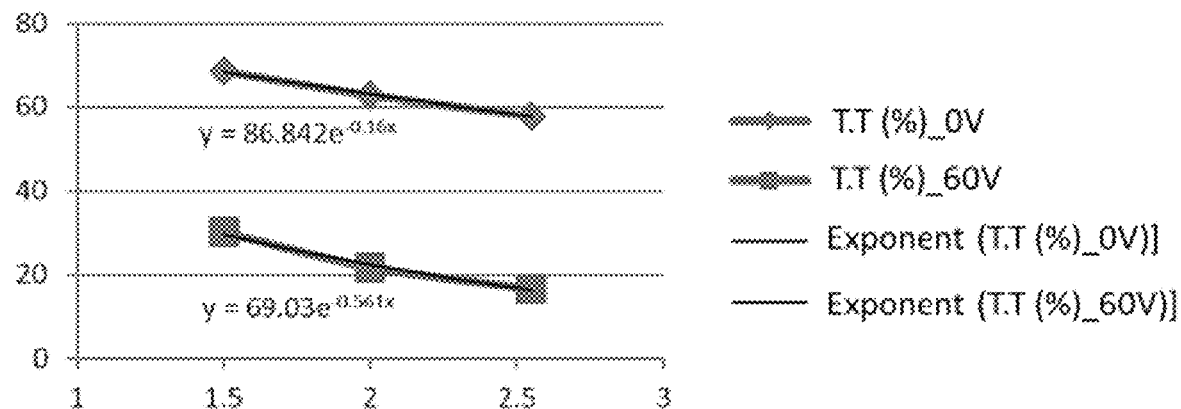
[Figure 3]
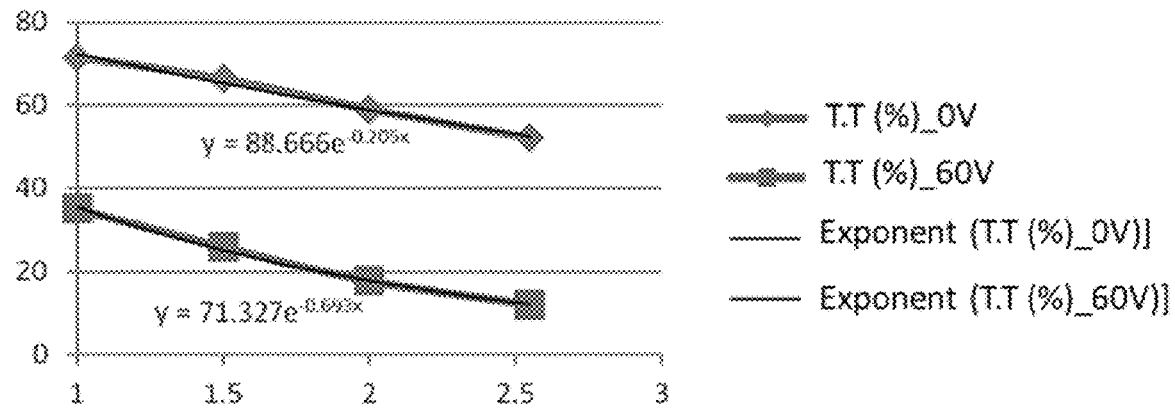

[Figure 4]
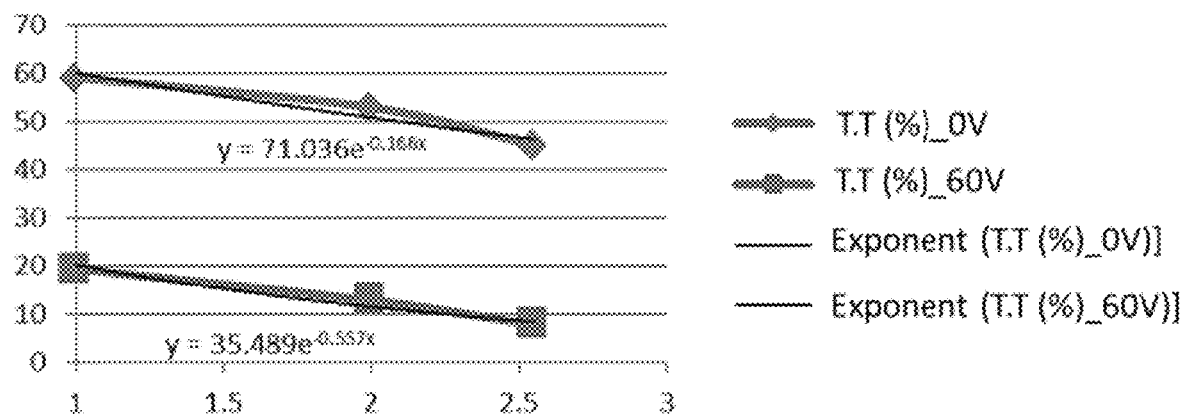
[Figure 5]
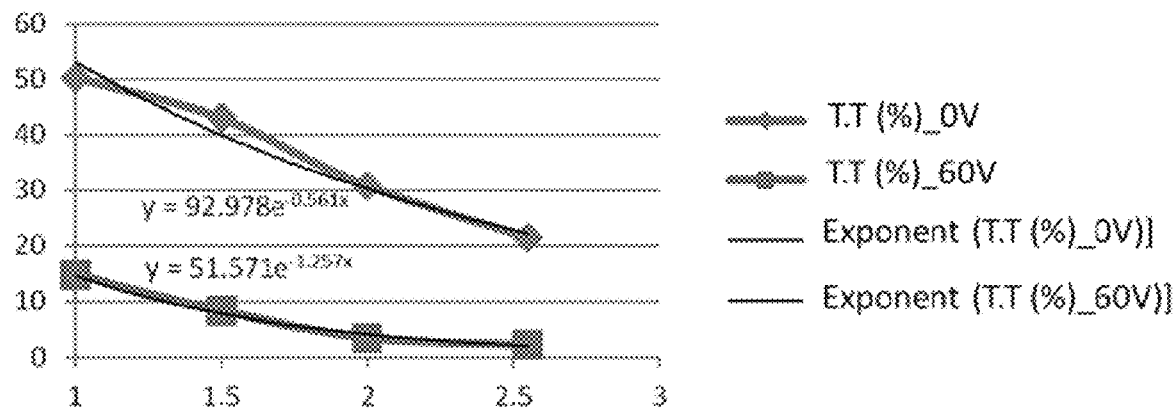

LIGHT MODULATION ELEMENT

CROSS-REFERENCE TO RELATED APPLICATIONS

The present application is a national phase entry under 35 U.S.C. § 371 of PCT/KR2020/002995, filed Mar. 3, 2020, which claims priority from Korean Patent Application No. 10-2019-0026114 filed on Mar. 7, 2019, the disclosures of which are incorporated herein by reference in their entirety.

TECHNICAL FIELD

The present application relates to a light modulation element.

BACKGROUND ART

A light scattering element may mean an element varying between a transparent mode and a scattering mode of light. For example, a dynamic scattering mode may implement a light scattering mode by adding a conductive material to nematic liquid crystals.

When a dye having dichroic absorption is added to a liquid crystal composition in the dynamic scattering mode, a bright-transparent mode and a dark-scattering mode may be realized, thereby realizing a transparently bright state and an opaquely dark state. In a dynamic scattering mode liquid crystal cell, the liquid crystal molecules in the absence of voltages form uniformly vertical orientation due to the orientation force of the vertical alignment film and the dye also stands vertically depending on the orientation of the liquid crystal molecules, whereby light absorption is minimized, so that the transparent mode can be realized. When an alternate voltage is applied to the liquid crystal cell, the liquid crystal molecules are polarized by an electric field to form horizontal orientation, and the conductive material generates vortices between two electrodes and disturb orientation of the liquid crystal molecules. Since the dye is also oriented horizontally and the orientation is disturbed, light absorption is maximized and light scattering is generated, so that the scattering mode can be realized.

Such a dynamic scattering element may be used for a light-shielding plate of a transparent display such as an OLED (organic light emitting device) or a screen such as a projector. However, in the light scattering mode, if the transmittance is 10% or more, the rear image can be blocked, but brightness of black is reduced to gray, so that the brightness of the second display is very low. In order to solve this matter, efforts are needed to improve the contrast ratio (CR) that can make the transmittance of the light scattering element darker (Patent Document 1: Korean Laid-Open Patent Publication No. 2014-0070480).

DISCLOSURE

Technical Problem

The present application provides a light modulation element capable of varying between a bright transparent mode and a dark scattering mode, and improving contrast ratios and haze-variable characteristics, without precipitation of dichroic dyes and increase in power consumption.

Technical Solution

The present application relates to a light modulation element. The light modulation element may comprise a light modulation layer. In the present application, the term light modulation element or light modulation layer may mean an element or layer having a function of blocking or transmitting light according to application of external energy, for example, according to whether or not external energy is applied.

The light modulation element may switch between a black state and a transmission state according to application of external energy. The black state means a state where the total transmittance is relatively low (hereinafter, may be referred to as a dark state) and/or a state where haze is relatively high (hereinafter, may referred to as a scattering state). The transmission state means a state where the total transmittance is relatively high (hereinafter, may be referred to as a bright state) and/or a state where haze is relatively low (hereinafter, may referred to as a transparent state).

The light modulation element may comprise a first light modulation layer and a second light modulation layer. The first light modulation layer and the second light modulation layer may be included in a state where they are disposed to overlap each other. Accordingly, light transmitted through the first light modulation layer may be incident onto the second light modulation layer, and conversely, light transmitted through the second light modulation layer may also be incident onto the first light modulation layer. FIG. 1 is a diagram schematically showing a state of the first light modulation layer (100) and the second light modulation layer (200) overlapping with each other as described above. In this specification, such a structure may be referred to as a double cell structure.

The first light modulation layer and the second light modulation layer may each be a haze-variable layer.

In the present application, the haze-variable layer may be switched between a first state and a second state, from which haze is different, according to application of external energy, and may mean a layer that a difference in haze between the first state and the second state is 10% or more, 20% or more, 30% or more, 40% or more, 50% or more, 60% or more, 70% or more, or 80% or more.

The first light modulation layer and the second light modulation layer may each be a transmittance-variable layer.

In the present application, the transmittance-variable layer may be switched between a third state and a fourth state, from which total transmittance is different, according to application of external energy, and may mean a layer that a difference in total transmittance between the third state and the fourth state is 20% or more, 25% or more, 30% or more, or 40% or more.

The first light modulation layer and the second light modulation layer may each be in a bright state and a transparent state in a state where no voltage is applied, and be in a dark state and a scattering state in a state when a voltage is applied.

The light modulation element comprising the first light modulation layer and the second light modulation layer may also be in a bright state and a transparent state in a state where no voltage is applied, and be in a dark state and a scattering state in a state when a voltage is applied.

In one example, the first light modulation layer and the second light modulation layer may each have total transmittance of 50% or more, and haze of 20% or less, 15% or less, or 10% or less, in a state where no voltage is applied.

In one example, the first light modulation layer and the second light modulation layer may each have total transmittance of 20% or less, and haze of 80% or more, in a state when a voltage is applied, for example, in a state when a voltage of 60V is applied.

By overlapping and disposing the first light modulation layer and the second light modulation layer, which have such electrooptic characteristics, the present application can improve contrast ratios and haze-variable characteristics, while providing a light modulation element that can vary between the bright transparent mode and the dark scattering mode.

The light modulation element may have a contrast ratio (CR) of 10 or more as calculated by Equation 1 below.

$$CR=T(0V)/T(60V) \quad \text{[Equation 1]}$$

In Equation 1, T (0V) is the total transmittance (%) of the light modulation element in a state when no voltage is applied to each of the first light modulation layer and the second light modulation layer, and T (60V) is the total transmittance (%) of the light modulation element in a state when a voltage of 60V is applied to each of the first light modulation layer and the second light modulation layer.

The light modulation element may have a haze difference (ΔH) of 50% or more as calculated by Equation 2 below. The haze difference may be 50% or more, 60% or more, 70% or more, 80% or more, or 82% or more.

$$\Delta H=H(60V)-H(0V) \quad \text{[Equation 2]}$$

In Equation 2, H (0V) is the haze (%) of the light modulation element in a state when no voltage is applied to each of the first light modulation layer and the second light modulation layer, and H (60V) is the haze (%) of the light modulation element in a state when a voltage of 60V is applied to each of the first light modulation layer and the second light modulation layer.

Unless otherwise specified while describing the light modulation layer, it may be a content that can be applied to both the first light modulation layer and the second light modulation layer.

The first light modulation layer and the second light modulation layer may each be a liquid crystal layer comprising nematic liquid crystals. In this specification, the nematic liquid crystals may mean liquid crystals having a liquid crystal phase that directors of liquid crystal molecules are arranged in a predetermined direction, but are arranged without forming a layered structure or a planar structure.

As the nematic liquid crystals, a non-reactive liquid crystal compound may be used in terms of allowing the orientation of the liquid crystal to be changed by application of external action such as voltage. In the present application, the non-reactive liquid crystal compound may mean a liquid crystal compound without a reactive group, for example, a polymerizable group or a crosslinkable group. Here, the polymerizable group or crosslinkable group may be exemplified by an acryloyl group, an acryloyloxy group, a methacryloyl group, a methacryloyloxy group, a carboxyl group, a vinyl group, an epoxy group, and the like, but is not limited thereto, and known reactive functional groups known as polymerizable groups or crosslinkable groups may be included.

The dielectric anisotropy of the nematic liquid crystal may be appropriately selected within a range without impairing the object of the present application. In this specification, the term "dielectric constant anisotropy (Δε)" means a difference (ε//−ε⊥) between the horizontal dielectric constant (ε//) and the vertical dielectric constant (ε⊥) of liquid crystals. Also, in this specification, the term "horizontal dielectric constant (ε//)" means a dielectric constant value measured along the direction of an electric field in a state when a voltage is applied so that the optical axis of the liquid crystal and the direction of the electric field by the applied voltage are substantially horizontal, and the term "vertical dielectric constant (ε⊥)" means a dielectric constant value measured along the direction of an electric field in a state when a voltage is applied so that the optical axis of the liquid crystal and the direction of the electric field by the applied voltage are substantially perpendicular.

The dielectric constant anisotropy (Δε) of the nematic liquid crystal may be a negative number. In this case, the absolute value of the dielectric constant anisotropy (Δε) of the nematic liquid crystal may be, for example, in a range of about 1 to 20. The lower limit of the absolute value of the dielectric constant anisotropy (Δε) of the nematic liquid crystal may be 1 or more, 2 or more, or 3 or more, and the upper limit of the absolute value of the dielectric constant anisotropy (Δε) of the nematic liquid crystal may be 20 or less, 18 or less, 16 or less, 14 or less, 12 or less, 10 or less, 8 or less, or 6 or less. When the dielectric constant anisotropy of the nematic liquid crystals satisfies the above range, it is advantageous in implementing a liquid crystal cell switching between a transparent mode and a scattering mode, because it can be driven with a low driving voltage and exhibit excellent haze characteristics.

The refractive index anisotropy of the nematic liquid crystals may be appropriately selected in consideration of the desired physical properties, for example, the haze characteristics of the light modulation element. The term "refractive index anisotropy" may mean a difference between an extraordinary refractive index and an ordinary refractive index of liquid crystals. The refractive index anisotropy of the liquid crystals may be, for example, 0.1 or more, 0.12 or more, or 0.15 or more, and may be in a range of 0.3 or less, 0.25 or less, or 0.23 or less. When the refractive index anisotropy of the liquid crystals satisfies the above range, for example, a light modulation element having excellent haze characteristics can be implemented.

The first light modulation layer and the second light modulation layer may each further comprise a dichroic dye. The dichroic dye may allow the light modulation layer or the light modulation element to exhibit variable characteristics for the total transmittance according to application of an external voltage.

In the present application, the term "dye" may mean a material capable of intensively absorbing and/or modifying light in at least a part or the entire range from a visible light region, for example, a wavelength range of 400 nm to 700 nm, and the term "anisotropic dye" may mean a material capable of anisotropic absorption of light in at least a part or the entire range of the visible light region.

As the dichroic dye, for example, a known dye known to have properties that can be aligned depending on the alignment state of the liquid crystal compound by a so-called host guest effect can be selected and used. As the dichroic dye, for example, a black dye can be used. Such a dye is known, for example, as an azo dye or an anthraquinone dye, and the like, but is not limited thereto.

As the dichroic dye, a dye having a dichroic ratio, that is, a value obtained by dividing the absorption of the polarized light parallel to the long axis direction of the anisotropic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The ratio of the dichroic dye in the light modulation layer may be selected in consideration of the desired contrast ratio or variable characteristics of transmittance. If the concentration of the dichroic dye increases, the contrast ratio can be improved, but when the concentration of the dichroic dye is too high, the precipitation of the dye is concerned, and when the transmittance plot for each concentration is performed, the reduction width of the transmittance in the scattering mode tends to be low, as the concentration of the dye increases.

In terms of ensuring proper solubility of the dichroic dye in the host liquid crystals, the dichroic dye may be included in a ratio of 5 wt % or less, 4 wt % or less, 3 wt % or less, 2.5 wt % or less, 2 wt % or less, or 1.5 wt % or less. The lower limit of the content of the dichroic dye may be, for example, 0.01 wt % or more, or 0.1 wt % or more. When the light modulation layer further comprises a conductive additive, as described below, the concentration (wt %) of the dichroic dye may be a value obtained as a percentage of the weight of the dichroic dye relative to the total weight of the nematic liquid crystals and the conductive additive.

The first light modulation layer and the second light modulation layer may each further comprise a conductive additive. The conductive additive may allow the light modulation layer or the light modulation element to exhibit variable characteristics for haze according to application of an external voltage.

The conductive additive may function to realize EHDI (electro hydro dynamic instability) characteristics in the liquid crystal layer by increasing the conductivity of the liquid crystal layer. The scattering may occur when an alternate voltage is applied to the liquid crystal layer comprising the conductive additive and the nematic liquid crystals in the vertical direction. Specifically, when an electric field is applied in a direction perpendicular to the substrate of the liquid crystal layer, the liquid crystal molecules are laid horizontally due to negative dielectric constant anisotropy, and the conductive additive and dichroic dye are also laid. At this time, due to the high conductivity of the conductive additive, the mobility of impure ions to the alternate voltage is large, thereby giving strong shaking to the lying liquid crystal molecules. The physical shaking of molecules means the shaking of the refractive index of light, whereby the light scattering can occur. The scattering mode in such a manner may be referred to as a dynamic scattering mode.

The conductive additive may be a highly conductive compound. The electrical conductivity of the conductive additive may be, for example, in a range of $2 \times 10^{-4}$ μS/cm to $5 \times 10^{-3}$ μS/cm. Such a range of electrical conductivity may be suitable for implementation of dynamic scattering modes.

As the conductive additive, for example, a liquid crystal monomer or a liquid crystal single molecule may be used. In this specification, the term "liquid crystal monomer" may mean a compound containing a site capable of exhibiting liquid crystallinity, for example, a mesogen skeleton, and at least one reactive functional group. Such a liquid crystal monomer may be referred to as a reactive mesogen as described below. In this specification, the term "liquid crystal single molecule" may mean a compound containing a site capable of exhibiting liquid crystallinity, for example, a mesogen skeleton, but no reactive functional group.

In addition to the liquid crystal monomer or the liquid crystal single molecule, the kind of the conductive additive for realizing a dynamic scattering mode is known, and for example, an ionic impurity, an ionic liquid, a salt, an initiator, and the like can be used. As the ionic impurity, for example, TEMPO (2,2,6,6-tetramethylpiperidine-1-oxyl free radical) and the like can be used; as the ionic liquid, for example, BMIN-BF4 ([1-butyl-3-methylimideazolium] BF4) and the like can be used; as the salt, for example, CTAB (cetrimonium bromide), CTAI (cetrimonium iodide) or $CTAI_3$ (cetrimonium triiodide), and the like can be used; and as the initiator, for example, TPO (2,4,6-trimethylbenzoyl-diphenyl-phosphineoxide) and the like can be used.

In one example, a reactive mesogen may be used as the conductive additive in order to form a liquid crystal layer having excellent solubility in the host liquid crystals, and having excellent physical properties, while reducing a difference in dispersion characteristics. Since the reactive mesogen as the conductive additive can secure solubility in a nematic liquid crystal medium, a larger amount of the reactive mesogen can be used freely as compared to the ionic compound used as a conventional additive as needed, so that the degree of freedom can be increased in producing a liquid crystal cell.

As described above, the reactive mesogen may be a compound comprising a mesogen skeleton and at least one reactive functional group. As the reactive functional group, for example, a polymerizable functional group or a crosslinkable functional group may be exemplified. The reactive mesogen may exist in a non-reacted state, that is, a state where the polymerization is not performed, in the liquid crystal layer, and if necessary, at least a part may also be polymerized.

The reactive mesogen may include a polyfunctional reactive mesogen or a monofunctional reactive mesogen. In this specification, the term "polyfunctional reactive mesogen" may mean a compound containing two or more reactive functional groups of the mesogens. In one example, the polyfunctional reactive mesogen may comprise 2 to 10, 2 to 8, 2 to 6, 2 to 5, 2 to 4, 2 to 3 or 2 reactive functional groups. In addition, the term "monofunctional reactive mesogen" may mean a compound containing one reactive functional group of the mesogens.

The reactive mesogen may be, for example, a compound represented by Formula 1 below.

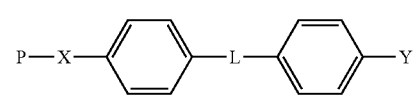

[Formula 1]

In Formula 1, P is a (meth)acrylate group, a carboxyl group, a hydroxyl group, a vinyl group, an epoxy group or a nitro group, X is a single bond, a substituted or unsubstituted alkylene group having 1 to 10 carbon atoms, or a substituted or unsubstituted alkoxylene group having 1 to 10 carbon atoms, L is a single bond, a substituted or unsubstituted alkylene group having 1 to 10 carbon atoms, a substituted or unsubstituted alkenylene group having 1 to 10 carbon atoms, a substituted or unsubstituted alkynylene group having 1 to 10 carbon atoms, a substituted or unsubstituted alkoxylene group having 1 to 10 carbon atoms, —O— or —COO—, and Y is hydrogen, halogen, a cyano group, a substituted or unsubstituted alkyl group having 1 to 10 carbon atoms, or an alkoxy group having 1 to 10 carbon atoms unsubstituted or substituted with one or more substituents selected from the group consisting of a cyano group, halogen and alkenyl group.

In one example, the conductive additive or reactive mesogen may be included in a ratio of 0.1 to 30 parts by weight relative to 100 parts by weight of the nematic liquid crystals. Specifically, the conductive additive or reactive mesogen may be included in a ratio of 0.1 parts by weight or more, 1 part by weight or more, 2 parts by weight or more, 3 parts by weight or more, 4 parts by weight or more, 5 parts by weight or more, 6 parts by weight or more, 7 parts by weight or more, 8 parts by weight or more, 9 parts by weight or more, or 10 parts by weight or more, and in a ratio of 30 parts by weight or less, 28 parts by weight or less, 26 parts by weight or less, 24 parts by weight or less, 22 parts by weight or less, 20 parts by weight or less, 18 parts by weight or less, 16 parts by weight or less, 14 parts by weight or less, or 12 parts by weight or less, relative to 100 parts by weight of the nematic liquid crystals. When the conductive additive or reactive mesogen ratio satisfies the above range, the desired physical properties can be effectively implemented to provide a liquid crystal cell having excellent driving voltage characteristics and haze characteristics.

The light modulation layer may not comprise an ionic compound, for example, the ionic liquid or salt as described above, if possible. Such an ionic compound is widely known as additives for controlling the conductivity of the liquid crystal layer, but such an ionic compound has poor solubility in the host liquid crystals, so that it may deteriorate the physical properties of the liquid crystal layer. Accordingly, the ratio of the ionic compound in the light modulation layer may be 2 wt % or less, 1.5 wt % or less, 1 wt % or less, or about 0.7 wt % or less. Since the ionic compound is an optional component, the lower limit of the ratio is 0 wt %.

The liquid crystal layer may have a conductivity, for example, a horizontal conductivity of $1.0 \times 10^{-4}$ μS/cm or more. If the liquid crystal layer is adjusted to exhibit a horizontal conductivity in this range, it may be suitable for implementing a dynamic scattering mode. In another example, the horizontal conductivity of the liquid crystal layer may be $2.0 \times 10^{-4}$ μS/cm or more, $3.0 \times 10^{-4}$ μS/cm or more, $4.0 \times 10^{-4}$ μS/cm or more, $5.0 \times 10^{-4}$ μS/cm or more, $6.0 \times 10^{-4}$ μS/cm or more, $7.0 \times 10^{-4}$ μS/cm or more, $8.0 \times 10^{-4}$ μS/cm or more, $9.0 \times 10^{-4}$ μS/cm or more, or $1.0 \times 10^{-3}$ μS/cm or more. In another example, the horizontal conductivity may be $5.0 \times 10^{-2}$ μS/cm or less, $3.0 \times 10^{-2}$ μS/cm or less, $1.0 \times 10^{-2}$ 0/cm or less, $9.0 \times 10^{-3}$ μS/cm or less, $7.0 \times 10^{-3}$ μS/cm or less, $5.0 \times 10^{-3}$ μS/cm or less, $3.0 \times 10^{-3}$ μS/cm or less, or $2.5 \times 10^{-3}$ μS/cm or less.

Meanwhile, the vertical conductivity, which is described below, is a conductivity measured while applying a voltage to the liquid crystal layer, which may be a value measured along the direction of an electric field in a state when a voltage is applied such that the direction of the electric field by the applied voltage is substantially perpendicular to the optical axis of the liquid crystal layer. Here, the measurement frequency of the applied voltage may be 60 Hz, and the measurement voltage may be 0.5V.

The optical axis of the liquid crystal layer may be determined according to the type of liquid crystal compound. For example, if the liquid crystal compound is in a rod shape, the optical axis of the liquid crystal layer may mean the long axis direction in a state where the liquid crystal compounds included in the liquid crystal layer are oriented. For example, if the liquid crystal compounds in the liquid crystal layer are in a state vertically oriented parallel to the thickness direction of the liquid crystal layer, the horizontal conductivity may be a conductivity measured along the thickness direction in a state when a voltage is applied such that an electric field is formed along the thickness direction of the liquid crystal layer. In addition, if the liquid crystal compound in the liquid crystal layer is in a rod shape and the liquid crystal compounds are in a state horizontally oriented in the liquid crystal layer, the vertical conductivity may be a conductivity measured in the thickness direction while a voltage is applied so that an electric field is formed in the thickness direction of the liquid crystal layer.

Meanwhile, unless otherwise specified, in the present application, the vertical or horizontal conductivity may be a value obtained by converting the conductivity measured at room temperature according to each of the methods in a state when the measurement frequency of the voltage applied to the liquid crystal layer is set to 60 Hz and the voltage is set to 0.5V into a numerical value represented by a liquid crystal layer having an area of 1 cm² (width: 1 cm, length: 1 cm) and a thickness of 1 cm, as described above.

The equations applied to the conversion are as shown in Equations 3 to 5 below.

$$C = 1/\rho \quad \text{[Equation 3]}$$

$$R = 1/CR \quad \text{[Equation 4]}$$

$$R = \rho \times D/A \quad \text{[Equation 5]}$$

In Equations 3 to 5, C is the horizontal or vertical conductivity, p is the specific resistance of the liquid crystal layer, CR is the actual measurement value of the horizontal or vertical conductivity, R is the resistance of the liquid crystal layer, D is the thickness of the liquid crystal layer, and A is the area of the liquid crystal layer.

For example, after obtaining the resistance (R) by substituting the actual measurement value (CR) of the conductivity measured for the liquid crystal layer having predetermined thickness and area into Equation 4, the vertical or horizontal conductivity may be obtained by obtaining the specific resistance (p) of the liquid crystal layer (area: 1 cm² (=width: 1 cm, length: 1 cm) and thickness: 1 cm) using the resistance (R) and Equation 5, and substituting the specific resistance into Equation 3.

In addition, unless otherwise specified, in the present application, the conductivity is a value obtained by converting the conductivity measured at room temperature in conditions of a measurement frequency of 60 Hz and a measurement voltage of 0.5V into a numerical value represented by a liquid crystal layer having an area of 1 cm² (width: 1 cm, length: 1 cm) and a thickness of 1 cm, as described above, where the conductivity can be measured according to the manufacturer's manual using a measuring instrument (LCR meter, manufactured by Aglient Co., Ltd., E4980A). Meanwhile, among physical properties described herein, when the measured temperature affects the values, the relevant physical property is a value measured at room temperature, unless otherwise specified. Here, the term room temperature is a natural temperature without warming or cooling, which may mean any one temperature in a range of 10° C. to 30° C., for example, a temperature of about 23° C. or about 25° C. or so.

Here, the ratio (PC/VC) of the horizontal conductivity (PC) of the liquid crystal layer to the vertical conductivity (VC) of the liquid crystal layer may be about 0.2 or more, about 0.25 or more, about 0.3 or more, about 0.35 or more, about 0.4 or more, about 0.45 or more, about 0.5 or more, about 0.55 or more, about 0.6 or more, about 0.65 or more, or about 0.7 or more. In addition, the ratio (PC/VC) may be about 2.5 or less, about 2.0 or less, about 1.5 or less, or about 1.0 or less. Here, the ratio (VC/PC) of the vertical conductivity (VC) of the liquid crystal layer to the horizontal conductivity (PC) of the liquid crystal layer may be about 2.0 or less, about 1.9 or less, about 1.8 or less, about 1.7 or less, about 1.6 or less, about 1.5 or less, about 1.4 or less, about 1.3 or less, about 1.2 or less, about 1.1 or less, or about 1.0 or less. In addition, the ratio (VC/PC) may be about 0.5 or more, about 0.3 or more, about 0.2 or more, or about 0.1 or more. Such conductivities (PC, VC) may also be adjusted by appropriate addition of the aforementioned additives. If the ratios (VC/PC and/or PC/VC) of conductivities are adjusted as above, it may be advantageous in terms of driving efficiency of the liquid crystal element.

The first light modulation layer and the second light modulation layer may each have a thickness of 4 µm or more, 6 µm or more, 8 µm or more, or 10 µm or more. If the concentration of the dichroic dye is constant, the thicker the light modulation layer, the higher the contrast ratio. However, when the thickness is excessively thick, there may be a problem that the consumed power increases as the applied voltage increases significantly, and even if the dye is reduced according to the increased cell gap, the variable rate may be limited. Considering this matter, the thickness may be, for example, about 25 µm or less.

The first light modulation layer and the second light modulation layer may switch between a uniaxially oriented state and a randomly oriented state according to application of external energy. The uniaxially oriented state may be, for example, a vertically oriented state.

The first light modulation layer and the second light modulation layer may comprise nematic liquid crystals and dichroic dyes in a state aligned in one direction in a state when no voltage is applied. In one example, the first light modulation layer and the second light modulation layer may each comprise nematic liquid crystals and dichroic dyes in a vertically oriented state in a state when no voltage is applied.

In the present application, the vertically oriented state may mean a state where the angle formed by the optical axis of the liquid crystal molecule with respect to the plane horizontal to the liquid crystal layer is about 70 degrees to 90 degrees, 75 degrees to 90 degrees, 80 degrees to 90 degrees, or 85 degrees to 90 degrees. In the present application, the horizontally oriented state may mean a state where the angle formed with respect to the plane horizontal to the liquid crystal layer is about 0 degrees to 20 degrees, 0 degrees to 15 degrees, 0 degrees to 10 degrees, or 0 degrees to 5 degrees.

The light modulation element may further comprise a first substrate and a second substrate disposed opposite to both sides of the first light modulation layer, and a third substrate and a fourth substrate disposed opposite to both sides of the second light modulation layer. The first substrate, the second substrate, the third substrate and the fourth substrate may each comprise a base layer, an electrode layer and an alignment film sequentially. The first light modulation layer may be adjacent to the alignment film of the first substrate and the alignment film of the second substrate. The second light modulation layer may be adjacent to the alignment film of the third substrate and the alignment film of the fourth substrate.

The structure comprising the first substrate, the first light modulation layer and the second substrate may be referred to as a first liquid crystal cell, and the structure comprising the third substrate, the second light modulation layer and the fourth substrate may be referred to as a second liquid crystal cell. In this way, the light modulation element having two liquid crystal cells may be referred to as a light modulation element with a double cell structure.

The first liquid crystal cell and the second liquid crystal cell may be attached through a pressure-sensitive adhesive or an adhesive. Specifically, the second substrate of the first liquid crystal cell and the third substrate of the second liquid crystal cell may be attached via the pressure-sensitive adhesive or adhesive.

As the adhesive or pressure-sensitive adhesive, a known transparent adhesive used for attaching an optical element can be used, and for example, an OCA (optically clear adhesive) or OCR (optically clear adhesive) can be used, without being limited thereto. As the pressure-sensitive adhesive or adhesive, an acryl-based, silicone-based, epoxy-based pressure-sensitive adhesive or adhesive may be used, without being limited thereto.

As the base layer, a known material can be used without particular limitation. For example, a glass base material, a silicone base material or a plastic film base material can be used. The base material may be an optically isotropic base material or an optically anisotropic base material having a phase difference value. If necessary, a coating layer of gold, silver, or a silicon compound such as silicon dioxide or silicon monoxide or a coating layer such as an antireflection layer may also be present in the base layer.

As the plastic film base material, a film base material comprising TAC (triacetyl cellulose); COP (cyclo olefin copolymer) such as norbornene derivatives; PMMA (poly (methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthalate); PET (polyethyleneterephtalate); PI (polyimide); PSF (polysulfone); PAR (polyarylate) or an amorphous fluorine resin, and the like may be used, without being limited thereto.

The base layers included in the first substrate, the second substrate, the third substrate and the fourth substrate may each independently be a glass base material or a plastic film base material. The base layers included in the first substrate, the second substrate, the third substrate and the fourth substrate may be referred to as a first base layer, a second base layer, a third base layer and a fourth base layer, respectively.

As one example, the first base layer, the second base layer, the third base layer and the fourth base layer may all be glass base materials. As another example, the first base layer, the second base layer, the third base layer and the fourth base layer may all be plastic film base materials. As another example, the first base layer and the second base layer may be glass base materials, and the third base layer and the fourth base layer may be plastic film base materials. Alternatively, the first base layer and the second base layer may be plastic film base materials, and the third base layer and the fourth base layer may be glass base materials.

The electrode layers included in the first substrate, the second substrate, the third substrate and the fourth substrate may each apply an electric field to the liquid crystal layer so that the alignment state of the liquid crystal molecules in the liquid crystal layer may be switched. The electrode layer may be formed by depositing a conductive polymer, a conductive metal, a conductive nanowire or a metal oxide such as ITO (indium tin oxide), and the like. The electrode layer may be formed to have transparency. In this field, various materials and methods capable of forming transparent electrode layers are known, and these methods can all be applied. If necessary, the electrode layer formed on the surface of the substrate may also be appropriately patterned.

The alignment films included in the first substrate, the second substrate, the third substrate and the fourth substrate may each be a vertical alignment film. As the vertical alignment film, any alignment film having vertical orientation ability with respect to liquid crystal molecules in adjacent liquid crystal layers can be selected and used without particular limitation. As such an alignment film, for example, a contact alignment film such as a rubbing alignment film, or an alignment film known that a photo-alignment film compound may be included to exhibit orientation characteristics by a non-contact method such as irradiation of linearly polarized light can be used.

The light modulation element may be applied to various applications requiring a light modulation function, which may be applied to, for example, applications of a smart window, a window protection film, a flexible display element, a light-shielding plate for a transparent display, or a screen such as a projector. The transparent display may be, for example, an OLED.

Advantageous Effects

The light modulation element of the present application can vary between a bright transparent mode and a dark scattering mode, and improve contrast ratios and haze-variable characteristics, without precipitation of dichroic dyes and increase in power consumption.

DESCRIPTION OF DRAWINGS

FIG. 1 exemplarily shows a light modulation element of the present application.
FIG. 2 is a graph of experimental results in Table 1.
FIG. 3 is a graph of experimental results in Table 2.
FIG. 4 is a graph of experimental results in Table 3.
FIG. 5 is a graph of experimental results in Table 4.

MODE FOR DISCLOSURE

Hereinafter, the present application will be described in detail through examples according to the present application and comparative examples not according to the present application, but the scope of the present application is not limited by the following examples.

Measurement Example 1. Measurement of Electrooptic Characteristics

For the light modulation elements produced in Examples and Comparative Examples, haze and transmittance depending on voltage application were measured according to ASTM D1003 standard, using a hazemeter (NDH-5000SP). EC1000S model equipment from NF was used for the voltage application, when an AC power was connected to the upper and lower ITO layers, and a square wave voltage was applied at a frequency of 60 Hz and a size of 0 to 70 Vrms.

Specifically, light is transmitted through the measurement object and incident into the integrating sphere, when in this process, the light is divided into diffusion light (DT, which means the sum of all diffused and emitted light) and parallel light (PT, which means exit light in the front direction excluding the diffusion light), and these lights are focused on the light receiving element in the integrating sphere, whereby the haze can be measured through the focused light. The total transmitted light (TT) by the above process is the sum (DT+PT) of the diffusion light (DT) and the parallel light (PT), where haze can be defined as a percentage (Haze (%)=100×DT/TT) of the diffusion light to the total transmitted light. In the following test examples, the total transmittance means the total transmitted light (TT).

Comparative Example 1: Production of Single Cell

An ITO (indium tin oxide) layer was formed on a PET (polyethylene terephthalate) film to prepare a PET-ITO film (Hansung Co., Ltd.) having a thickness of 50 μm. A release film of PET material is attached to the PET side of the PET-ITO film as a protective film. A first substrate was produced by coating a composition (RN-3954, Nissan) for forming a vertical alignment film on the ITO layer of the film using a 3 #bar, and then curing it at 150° C. for 20 minutes to form a vertical alignment film having a thickness of about 200 nm.

On the ITO layer of the same PET-ITO film as the PET-ITO film, column spacers having a height of 8 μm and a diameter of 15 μm were disposed at intervals of 250 μm. Next, a second substrate was prepared by forming a vertical alignment film in the same method as the first substrate.

In a 10 mL vial, 3.6 g of nematic liquid crystals (HNG726200-100, HCCH, dielectric constant anisotropy: −4.0, refractive index anisotropy: 0.225), 0.4 g of a conductive additive of Formula A below and 0.06 g of a dichroic dye (X12, BASF) were placed and then stirred at 100° C. for 24 hours to prepare a liquid crystal composition. The concentration of the dichroic dye can be a percentage of the weight of the dichroic dye to the total weight of the nematic liquid crystals and the conductive additive, where the concentration of the dichroic dye is 1.5 wt %.

A sealant was drawn on the edge of the alignment film surface of the second substrate with a seal dispenser. After the liquid crystal composition was applied onto the alignment film of the second substrate, the first substrate was laminated to produce a light modulation element with a single cell structure having a cell gap of 8 μm and an area of width×length=4.0 cm×2.2 cm.

[Formula A]

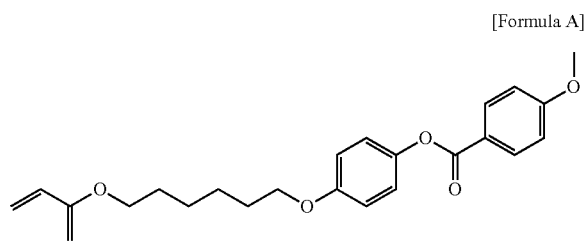 [SMILES: C=CC(=C)OCCCCCCOc1ccc(OC(=O)c2ccc(OC)cc2)cc1]

Comparative Examples 2 to 14

Light modulation elements with a single cell structure were produced in the same method as in Comparative Example 1, except that the cell gap size and dye concentration were changed as shown in Tables 1 to 4 below.

For Comparative Examples 1 to 14, the total transmittance (T (0V)) in a state when no voltage was applied and the total transmittance (T (60V)) in a state when a voltage of 60V was applied were measured, and the results were described in Tables 1 to 4 below. In Tables 1 to 4, the contrast ratio (CR) is a ratio of T (0V)/T (60V). FIGS. 2, 3, 4 and 5 are graphs of the experimental results of Table 1, Table 2, Table 3 and Table 4, respectively. In the experimental result graphs, the y-axis represents the total transmittance (T.T) (%), and the x-axis represents the concentration (%) of the dichroic dye.

TABLE 1

|  |  | Cell Gap | Dye Concentration (wt %) | T(0 V) (%) | T(60 V) (%) | CR |
|---|---|---|---|---|---|---|
| Comparative Example | 1 | 8 μm | 1.5 | 68.52 | 30.2 | 2.27 |
|  | 2 | 8 μm | 2 | 62.84 | 21.83 | 2.88 |
|  | 3 | 8 μm | 2.55 | 57.94 | 16.73 | 3.46 |

TABLE 2

|  |  | Cell Gap | Dye Concentration (wt %) | T(0 V) (%) | T(60 V) (%) | CR |
|---|---|---|---|---|---|---|
| Comparative Example | 4 | 10 μm | 1 | 71.39 | 35.09 | 2.03 |
|  | 5 | 10 μm | 1.5 | 66.17 | 25.91 | 2.55 |
|  | 6 | 10 μm | 2 | 58.98 | 17.73 | 3.33 |
|  | 7 | 10 μm | 2.55 | 52.17 | 12.12 | 4.30 |

TABLE 3

|  |  | Cell Gap | Dye Concentration (wt %) | T(0 V) (%) | T(60 V) (%) | CR |
|---|---|---|---|---|---|---|
| Comparative Example | 8 | 12 μm | 1 | 59.3 | 19.56 | 3.03 |
|  | 9 | 12 μm | 2 | 53.08 | 12.97 | 4.09 |
|  | 10 | 12 μm | 2.55 | 45.3 | 7.99 | 5.70 |

TABLE 4

|  |  | Cell Gap | Dye Concentration (wt %) | T(0 V) (%) | T(60 V) (%) | CR |
|---|---|---|---|---|---|---|
| Comparative Example | 11 | 15 μm | 1 | 50.28 | 14.85 | 3.39 |
|  | 12 | 15 μm | 1.5 | 43.08 | 8.32 | 5.18 |
|  | 13 | 15 μm | 2 | 30.79 | 3.58 | 8.60 |
|  | 14 | 15 μm | 2.55 | 21.53 | 2.26 | 9.53 |

Comparative Examples 15 to 18

Using the trend lines of the experimental result graphs in FIGS. 2, 3, 4 and 5, the concentration of the dichroic dye in each cell gap that the total transmittance was 40% in a state (0V) when no voltage was applied was obtained, and the total transmittance at the concentration upon applying a voltage of 60V was obtained and described in Table 5 below. In the exponent $y=ae^{-bx}$ of FIGS. 2 to 5, y means the total transmittance (T.T) (%), and x means the concentration of dichroic dye (%).

TABLE 5

|  |  | Cell Gap | Dye Concentration (wt %) | T(0 V) (%) | T(60 V) (%) | CR |
|---|---|---|---|---|---|---|
| Comparative Example | 15 | 8 μm | 4.845 | 40 | 4.56 | 8.77 |
|  | 16 | 10 μm | 3.88 | 40 | 4.85 | 8.25 |
|  | 17 | 12 μm | 3.46 | 40 | 5.17 | 7.74 |
|  | 18 | 15 μm | 1.503 | 40 | 7.80 | 5.13 |

From Table 5 above, the lower the cell gap, the more the CR value increases, but it can be seen that a CR of 10 or more cannot be obtained. In order to set the CR value to 10 or more, the concentration of the dichroic dye should be 5 wt % or more, and the cell gap should be lowered to 8 μm or less. However, this may cause a problem of dye precipitation (the saturation concentration of the dye is about 3 wt % for the host liquid crystal), and may cause a problem of processability due to the cell gap reduction.

Comparative Example 19

A light modulation element with a single cell structure was produced in the same method as in Comparative Example 1, except that the size of the cell gap was set to 10 μm and the concentration of the dichroic dye was changed to 1.71 wt %.

Comparative Example 20

A light modulation element with a single cell structure was produced in the same method as in Comparative Example 1, except that the size of the cell gap was set to 8 μm and the concentration of the dichroic dye was changed to 2.2 wt %.

Example 1

A first liquid crystal cell and a second liquid crystal cell were each produced in the same method as in Comparative Example 1, except that the cell gap was set to 10 μm and the concentration of the dichroic dye was changed to 1.71 wt %. The first liquid crystal cell and the second liquid crystal cell were attached via an OCA (LGC, V310) adhesive to produce a light modulation element with a double cell structure.

Example 2

A first liquid crystal cell and a second liquid crystal cell were each produced in the same method as in Comparative Example 1, except that the cell gap was set to 8 μm and the concentration of the dichroic dye was changed to 2.2 wt %. The first liquid crystal cell and the second liquid crystal cell were attached via an OCA (LGC, V310) adhesive to produce a light modulation element with a double cell structure.

Example 3

A first liquid crystal cell was produced in the same method as in Comparative Example 1, except that the cell gap was set to 10 μm and the concentration of the dichroic dye was changed to 1.71 wt %. A second liquid crystal cell was produced in the same method as in Comparative Example 1, except that the cell gap was set to 8 μm and the concentration of the dichroic dye was changed to 2.2 wt %. The first liquid crystal cell and the second liquid crystal cell were attached via an OCA (LGC, V310) adhesive to produce a light modulation element with a double cell structure.

Example 4

A first liquid crystal cell was produced in the same method as in Comparative Example 1, except that the cell gap was set to 10 μm and the concentration of the dichroic dye was changed to 1.71 wt %. A second liquid crystal cell was produced in the same method as in Comparative Example 1, except that the cell gap was set to 12 μm and the concentration of the dichroic dye was changed to 1 wt %. The first liquid crystal cell and the second liquid crystal cell were attached via an OCA (LGC, V310) adhesive to produce a light modulation element with a double cell structure.

For Comparative Examples 19 and 20, and Examples 1 to 4, the total transmittance T (0V) and the haze H (0V) in a state when no voltage was applied, and the total transmittance T (60V) and the haze H (60V) in a state when a voltage was applied were measured, and the results were described in Tables 6 to 11 below.

TABLE 6

| | Total Transmittance (%) | | Haze (%) | |
|---|---|---|---|---|
| Comparative | T(0 V) | 60.4 | H(0 V) | 6.84 |
| Example 19 | T(60 V) | 18.86 | H(60 V) | 87.56 |
| (Single Cell) | CR [T(0 V)/T(60 V)] | 3.20 | ΔH [H(60 V) − H(0 V)] | 80.81 |

TABLE 7

| | Total Transmittance (%) | | Haze (%) | |
|---|---|---|---|---|
| Example 1 | T(0 V) | 39.6 | H(0 V) | 9.32 |
| (Double | T(60 V) | 3.62 | H(60 V) | 93.92 |
| Cell) | CR [T(0 V)/T(60 V)] | 10.94 | ΔH [H(60 V) − H(0 V)] | 84.6 |

TABLE 8

| | Total Transmittance (%) | | Haze (%) | |
|---|---|---|---|---|
| Comparative | T(0 V) | 59.7 | H(0 V) | 6.71 |
| Example 20 | T(60 V) | 17.67 | H(60 V) | 87.15 |
| (Single Cell) | CR [T(0 V)/T(60 V)] | 3.4 | ΔH [H(60 V) − H(0 V] | 80.44 |

TABLE 9

| | Total Transmittance (%) | | Haze (%) | |
|---|---|---|---|---|
| Example 2 | T(0 V) | 41.32 | H(0 V) | 9.51 |
| (Double | T(60 V) | 3.61 | H(60 V) | 94.01 |
| Cell) | CR [T(0 V)/T(60 V)] | 11.45 | ΔH [H(60 V) − H(0 V] | 84.5 |

TABLE 10

| | Total Transmittance (%) | | Haze (%) | |
|---|---|---|---|---|
| Example 3 | T(0 V) | 40.12 | H(0 V) | 9.17 |
| (Double | T(60 V) | 3.65 | H(60 V) | 93.43 |
| Cell) | CR [T(0 V)/T(60 V)] | 10.99 | ΔH [H(60 V) − H(0 V] | 84.26 |

TABLE 11

| | Total Transmittance (%) | | Haze (%) | |
|---|---|---|---|---|
| Example 4 | T(0 V) | 41.31 | H(0 V) | 9.43 |
| (Double | T(60 V) | 4.03 | H(60 V) | 93.66 |
| Cell) | CR [T(0 V)/T(60 V)] | 10.25 | ΔH [H(60 V) − H(0 V] | 84.23 |

The light modulation elements with the single cell structure of Comparative Examples 19 and 20 and the light modulation elements with the double cell structure of Examples 1 to 4 all have no problem of dye precipitation and processability, but it can be seen that Examples 1 to 4 have significantly excellent contrast ratios (CR) and haze-variable characteristics as compared to Comparative Examples 1 and 2.

EXPLANATION OF REFERENCE NUMERALS

100: first light modulation layer, 200: second light modulation layer.

The invention claimed is:

1. A light modulation element comprising:
   a first light modulation layer comprising nematic liquid crystals and a dichroic dye, wherein the first light modulation layer is in a scattering mode when a voltage is applied and
   a second light modulation layer comprising nematic liquid crystals and a dichroic dye, wherein the second light modulation layer is in a scattering mode when a voltage is applied,
   wherein the first light modulation layer and the second light modulation layer are disposed to overlap each other, wherein the first and the second light modulation layers are haze variable layers, wherein the light modulation element is switchable between a first state and a second state having different hazes based on an external energy applied and having a haze difference of 10% or more between the first state and the second state.

2. The light modulation element according to claim 1, wherein the light modulation element has a contrast ratio (CR) of 10 or more as calculated by Equation 1 below:

$$CR=T(0V)/T(60V) \qquad [\text{Equation 1}]$$

wherein, T (0V) is a total transmittance (%) of the light modulation element in a state when no voltage is applied to each of the first light modulation layer and the second light modulation layer, and T (60V) is a total transmittance (%) of the light modulation element in a state when a voltage of 60V at a frequency of 60 Hz is applied to each of the first light modulation layer and the second light modulation layer.

3. The light modulation element according to claim 1, wherein the light modulation element has a haze difference (ΔH) of 50% or more as calculated by Equation 2 below:

$$\Delta H=H(60V)-H(0V) \qquad [\text{Equation 2}]$$

wherein, H (0V) is haze (%) of the light modulation element in a state when no voltage is applied to each of the first light modulation layer and the second light modulation layer, and H (60V) is haze (%) of the light modulation element in a state when a voltage of 60V is applied to each of the first light modulation layer and the second light modulation layer.

4. The light modulation element according to claim 1, wherein the first light modulation layer and the second light modulation layer each comprise the nematic liquid crystals and the dichroic dye in a vertically oriented state when no voltage is applied.

5. The light modulation element according to claim 1, wherein the nematic liquid crystals included in each of the first light modulation layer and the second light modulation layer have negative dielectric constant anisotropy.

6. The light modulation element according to claim 1, wherein the first light modulation layer and the second light modulation layer each further comprise a conductive additive.

7. The light modulation element according to claim 6, wherein the electrical conductivity of the conductive additive is from $2\times10^{-4}$ μS/cm to $5\times10^{-3}$ μS/cm.

8. The light modulation element according to claim 6, wherein the conductive additive comprises a reactive mesogen.

9. The light modulation element according to claim 6, wherein the conductive additive is a compound represented by Formula 1 below:

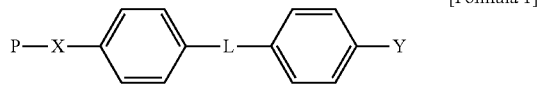

[Formula 1]

wherein, P is a (meth)acrylate group, a carboxyl group, a hydroxyl group, a vinyl group, an epoxy group or a nitro group, X is a single bond, a substituted or unsubstituted alkylene group having 1 to 10 carbon atoms, or a substituted or unsubstituted alkoxylene group having 1 to 10 carbon atoms, L is a single bond, a substituted or unsubstituted alkylene group having 1 to 10 carbon atoms, a substituted or unsubstituted alkenylene group having 1 to 10 carbon atoms, a substituted or unsubstituted alkynylene group having 1 to 10 carbon atoms, a substituted or unsubstituted alkoxylene group having 1 to 10 carbon atoms, —O— or —COO—, and Y is hydrogen, halogen, a cyano group, a substituted or unsubstituted alkyl group having 1 to 10 carbon atoms, or an alkoxy group having 1 to 10 carbon atoms unsubstituted or substituted with one or more substituents selected from the group consisting of a cyano group, halogen and alkenyl group.

10. The light modulation element according to claim 1, wherein a concentration of the dichroic dye included in each of the first light modulation layer and the second light modulation layer is from 0.01 wt % to 5 wt %.

11. The light modulation element according to claim 1, wherein the first light modulation layer and the second light modulation layer each have a thickness from 4 μm to 25 μm.

12. The light modulation element according to claim 1, further comprising a first substrate and a second substrate disposed opposite to both sides of the first light modulation layer and a third substrate and a fourth substrate disposed opposite to both sides of the second light modulation layer, wherein the first substrate, the second substrate, the third substrate and the fourth substrate each comprise a base layer, an electrode layer and a vertical alignment film sequentially.

13. The light modulation element according to claim 12, wherein the second substrate and the third substrate are attached via a pressure-sensitive adhesive or an adhesive.

14. The light modulation element according to claim 12, wherein the base layers included in the first substrate, the second substrate, the third substrate and the fourth substrate are each independently a glass base material or a plastic film base material.

* * * * *